United States Patent
Majewski

[11] 3,782,839
[45] Jan. 1, 1974

[54] REINFORCING BAR, BOLT OR THE LIKE

[75] Inventor: Martin Majewski, Schwicheldt, Germany

[73] Assignee: Stahlwerke Peine-Salzgitter AG, Peine, Germany

[22] Filed: Aug. 30, 1971

[21] Appl. No.: 176,181

[30] Foreign Application Priority Data
Sept. 1, 1970 Germany............... P 20 43 274.0

[52] U.S. Cl............ 403/43, 403/307, 52/726, 52/740
[51] Int. Cl.............................................. F16b 7/06
[58] Field of Search.................... 287/60, 62, 117; 52/726, 735, 737, 738, 739, 740

[56] References Cited
UNITED STATES PATENTS

| | | | |
|---|---|---|---|
| 947,199 | 1/1910 | Kuester | 52/740 |
| 1,016,984 | 2/1912 | Collins | 52/740 |
| 1,400,570 | 12/1921 | Paque | 52/740 |
| 1,428,561 | 9/1922 | Schuster | 52/740 |
| 3,561,185 | 2/1971 | Finsterwalder et al. | 52/737 |
| 3,638,978 | 2/1972 | Guntermann | 52/726 |
| 1,274,923 | 8/1918 | Meyner | 85/21 |
| 3,415,552 | 12/1968 | Howlett | 287/117 |
| 3,567,254 | 3/1971 | Parssinen | 287/117 |

FOREIGN PATENTS OR APPLICATIONS

| | | | |
|---|---|---|---|
| 303,187 | 7/1955 | Switzerland | 52/740 |
| 497,210 | 8/1938 | Great Britain | 52/739 |
| 1,189,577 | 3/1959 | France | 52/737 |
| 834,729 | 5/1960 | Great Britain | 287/60 |

Primary Examiner—James R. Boler
Assistant Examiner—Wayne L. Shedd
Attorney—Karl F. Ross

[57] ABSTRACT

A rod of circular cross-section is provided on opposite sides with two sets of equispaced ribs, each extending over substantially 180°, which are tangentially faired at their ends into the rod surface at a median plane separating the two sets. The ribs of these sets are relatively offset by half their spacing whereby they can mate with a female helical thread of corresponding pitch in a coupling nut or anchor sleeve.

5 Claims, 4 Drawing Figures

PATENTED JAN 1 1974  3,782,839

Martin Majewski
INVENTOR.

BY
Karl F. Ross
Attorney

REINFORCING BAR, BOLT OR THE LIKE

My present invention relates to a bolt or bar designed to co-operate with an internally threaded sleeve or nut as a complementary male member. Such a bar may be used, for example, as a reinforcement or prestressing element for a concrete structure, with the female member or sleeve acting as an abutment or as a coupling between two similar bars.

Conventional bars or bolts of that character, provided with male threads over all or part of their length, must be machined for this purpose or fitted with suitable terminals. An object of my present invention is to provide a bar of this type so profiled as to lend itself to alternate manufacturing processes, e.g. by rolling.

It is also an object of my invention to provide a bar whose profile, designed for engagement with a female helical thread, is more rugged and less susceptible to wear or defor-mation than the usual male threads of such bars.

These objects are realized, pursuant to the present invention, by the provision of a rod consisting essentially of a core of circular cross-section carrying two sets of transverse ribs which extend over diametrically opposite surface portions of that core, the spacing of the ribs of each set equaling the pitch of the associated sleeve; the ribs of the two sets are relatively staggered by half that pitch whereby, with proper dimensioning of the ribs and the sleeve thread, the two members can matingly engage each other. For this purpose it is, of course, necessary that the inner sleeve diameter be less than the width of the rod in a radial plane bisecting the two sets of ribs, yet greater than the rod diameter in a median plane perpendicular thereto; with the ribs faired tangentially into the core surface in the region of this median plane, the latter diameter equals that of the core.

Advantageously the ribs progressively decrease in height from their crests (located in the aforementioned radial plane) to their faired ends, with a corresponding reduction of the width of the rib at its root; this configuration simplifies manufacture by rolling and also facilitates the threading of the bar into and out of its sleeve.

Since a bar of this description can be indiscriminately used with right-hand and left-hand sleeve threads, owing to the transverse orientation of the ribs (i.e. their location in planes perpendicular to the core axis), two such bars may be readily interconnected by a turnbuckle with oppositely threaded ends.

The above and other features of my invention will be described in greater detail hereinafter with reference to the accompanying drawing in which.

Figure 1:
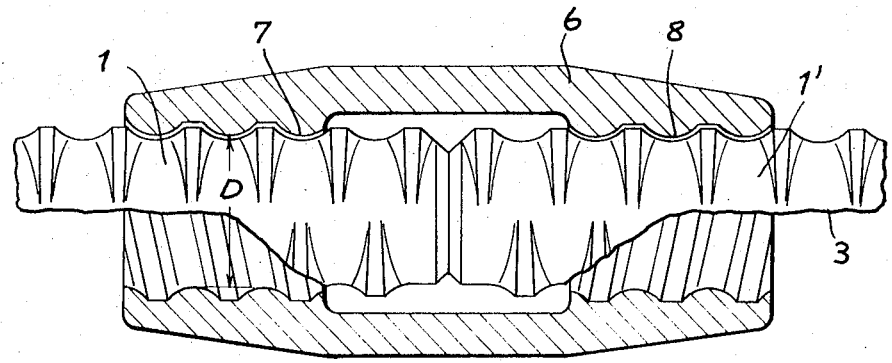
FIG. 1 shows, in axial section, a turnbuckle engangeing a pair of substantially identical ribbed bars (partly broken away) according to the invention.
Figure 4:
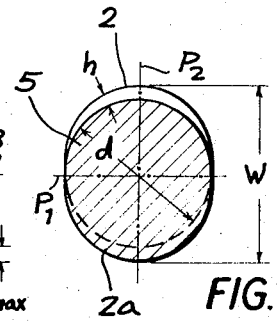
FIG. 4 is a cross-sectional view taken on the line IV—IV of FIG. 2.

In FIG. 1 I have shown a pair of coaxially disposed rods 1 and 1' each having a core 5 of circular cross-section (diameter $d$, FIG. 4) and being formed with two sets of axially equispaced ribs 2, 2a extending over substantially half the rod cifcumference on either side of a median plane $P_1$. As measured in a radial plane $P_2$ perpendicular thereto, which bisects the two sets of ribs, the rod has a width $W = d + 2h_{max}$ where $h_{max}$ is the maximum value of the height $h$ of each rib. This height, as best seen in FIG. 4, varies according to a generally sinusoidal law over an arc of 180°.

Figure 2:
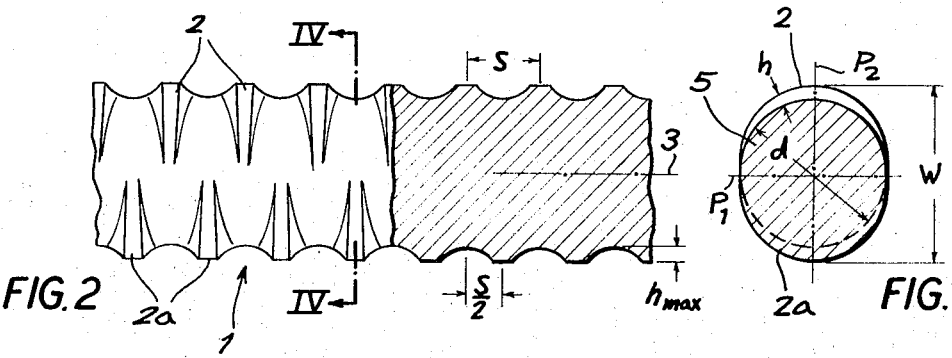
FIG. 2 is a side-elevational view, partly in section, of one of the bars shown in FIG. 1.

The two rods 1, 1' are engaged by a sleeve 6, designed as a turnbuckle, which is centered on their axis 3 and has lefthand female threads 7 and right-hand female threads 8 at opposite ends thereof; the inner diameter D of the sleeve is somewhat greater than he core diameter $d$ but less than the maximum width W of the rods. The threads 7, 8 have a depth approximately equal to the maximum rib height $h_{max}$ and have an undulating, generally sinusoidal longitudinal profile. The pitch of these threads corresponds to the spacing S (FIG. 2) of adjoining ribs 2 or 2a, these two sets of ribs being axially staggered by a distance S/2.

Figure 3:
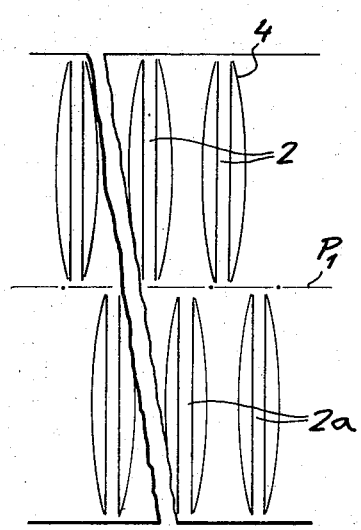
FIG. 3 is a development of the bar profile.

As best seen in the developed view of FIG. 3, the width of the ribs at their roots 4 also varies progressively over an arc of 180° in substantially the same manner as their height h.

Turnbuckle 6 can be rotated by any suitable tool to draw the rods 1, 1' torward each other or to disengage them. Naturally, this turnbuckle could also be replaced by a simple sleeve with a single thread, serving as an abutment or an end stop on one of the rods.

I claim:

1. In combination, a sleeve with a female helical thread and at least one rod having a core of circular cross-section provided with two sets of transverse ribs extending in planes perpendicular to the core axis over an arc of substantially 180° on diametricaly opposite surface portions thereof, the ribs of each set having a uniform spacing equal to the pitch of said thread, the ribs of said sets being relatively staggered by half said pitch, said sleeve having an inner diameter less than the width of said rod in a radial plane bisecting said ribs but greater than the diameter of said rod in a median plane perpendicular thereto, said ribs having roots of outwardly concave axial section whose width progressively decreases from said radial plane to said median plane, said rod entering said sleeve with said thread matingly engaging certain of said ribs, said ribs having flat crests of uniform axial width over their entire length, said ribs being faired into the surface of said core at said median plane.

2. The combination defined in claim 1 wherein said ribs progressively decreases in height from said radial plane to said median plane.

3. The combination defined in claim 2 wherein the height of said ribs varies substantialy sinusoidally over said arc.

4. The combination defined in claim 1 wherein said sleeve is a turnbuckle with said thread at one end and a similar thread of opposite pitch at the other end, further comprising a substantially identically profiled second rod engaging said thread of opposite pitch.

5. The combination defined in claim 1 wherein said thread has a generally sinusoidal longitudinal profile.

* * * * *